United States Patent
Matsuo et al.

(10) Patent No.: US 7,856,945 B2
(45) Date of Patent: Dec. 28, 2010

(54) ANIMAL LITTER BOX

(75) Inventors: Takayuki Matsuo, Tokyo (JP); Takeshi Ikegami, Tokyo (JP); Kenji Hiroshima, Tokyo (JP)

(73) Assignee: Uni-Charm Corporation, Ehime (JP)

( * ) Notice: Subject to any disclaimer, the term of this patent is extended or adjusted under 35 U.S.C. 154(b) by 112 days.

(21) Appl. No.: 12/116,359

(22) Filed: May 7, 2008

(65) Prior Publication Data

US 2009/0000560 A1 Jan. 1, 2009

(30) Foreign Application Priority Data

Jun. 29, 2007 (JP) .............................. 2007-173553

(51) Int. Cl.
*A01K 29/00* (2006.01)
(52) U.S. Cl. ...................... 119/166; 119/168
(58) Field of Classification Search ................. 119/161, 119/163, 165–170; *A01K 29/00, 1/00, 1/02, A01K 1/03*
See application file for complete search history.

(56) References Cited

U.S. PATENT DOCUMENTS

| | | | | |
|---|---|---|---|---|
| 399,753 A | * | 3/1889 | Jones | ......................... 220/252 |
| 2,661,114 A | * | 12/1953 | Barnett et al. | ............... 220/252 |
| 2,736,452 A | * | 2/1956 | Roop | ......................... 220/4.21 |
| 4,303,172 A | * | 12/1981 | Bosland | ...................... 220/252 |
| 5,360,132 A | * | 11/1994 | Edelhoff | ...................... 220/213 |
| 5,522,347 A | | 6/1996 | Merino | |
| 5,572,950 A | | 11/1996 | O'Rourke et al. | |
| D399,613 S | * | 10/1998 | O'Rourke et al. | ........... D30/161 |
| 6,196,161 B1 | * | 3/2001 | Thurber | ...................... 119/496 |
| 6,523,499 B1 | * | 2/2003 | Chrisco et al. | .............. 119/496 |
| 7,021,680 B2 | * | 4/2006 | VanSkiver et al. | ............. 292/87 |
| D591,463 S | * | 4/2009 | Plante | ........................ D30/161 |
| D601,313 S | * | 9/2009 | Kim | ........................... D30/161 |
| 2005/0211179 A1 | * | 9/2005 | Lewis, II | ..................... 119/168 |
| 2006/0288948 A1 | * | 12/2006 | Ikegami et al. | .............. 119/167 |
| 2007/0283896 A1 | * | 12/2007 | Walker | ........................ 119/166 |
| 2008/0264347 A1 | * | 10/2008 | Plante | ........................ 119/473 |
| 2009/0260577 A1 | * | 10/2009 | Lewis, II | ..................... 119/165 |

FOREIGN PATENT DOCUMENTS

| | | |
|---|---|---|
| JP | 58-70761 | 5/1983 |
| JP | 2002-325520 | 11/2002 |
| JP | 2004-121147 A | 4/2004 |
| JP | 2005006605 | 1/2005 |
| JP | 2006101890 | 4/2006 |
| JP | 2007159591 | 6/2007 |

* cited by examiner

*Primary Examiner*—Son T Nguyen
*Assistant Examiner*—Shadi Baniani
(74) *Attorney, Agent, or Firm*—Brinks Hofer Gilson & Lione

(57) ABSTRACT

An animal litter box having a movable hood can be used both in the open state and the closed state, and the movable hood can be compactly accommodated in the open state. The animal litter box includes an evacuation container and a hood, the hood having a fixed hood, a movable hood, and a pair of connecting portions. On the movable hood, an opening is provided to a front surface of the movable hood, wherein, the movable hood is rotatably movable with the movable hood 32 being located outside of the fixed hood, and wherein, when the movable hood is in the open state, the movable hood covers an outside of the fixed hood.

7 Claims, 5 Drawing Sheets

ANIMAL LITTER BOX

CROSS-REFERENCE TO RELATED APPLICATION

This application is based on and claims the benefit of priority from Japanese Patent Application No. 2007-173553, filed on 29 Jun. 2007, the content of which is incorporated herein by reference.

FIELD OF THE INVENTION

The present invention relates to an animal litter box.

BACKGROUND OF THE INVENTION

Conventionally, litter boxes for animals such as cats have been provided with an evacuation container of which an upper surface is open, and a hood covering the upper surface of the evacuation container and having an opening for animal going in and out. For such an animal litter box with a hood, when cleaning up the box, it is necessary to remove the hood or put one's hand into the box through the opening formed on the hood. However, it is inconvenient to take off the hood whenever cleaning up the box. Alternatively, it is hard to remove the urine or feces of an animal completely when putting one's hand into the box from the opening. To solve the abovementioned problems, Japanese Patent Application, First Publication No. 2004-121147 discloses an animal litter box comprising a hood having a hood body fixed to an evacuation container and a lid provided with a doorway. The lid is rotatably supported to the hood body, so that the hood can be positioned to select a closed state in which the lid is closed and an open state in which the lid is moved rotatably above so as to open an upper space of the evacuation container.

However, since the lid is moved rotatably over the hood body in the open state, it requires a substantial space above the animal litter box to open the lid. For example, in a case where an animal litter box is placed where there is little space above such as under a desk, there may be a problem that the lid cannot be opened at such a place as under a desk such that the animal litter box cannot be cleaned. In addition, since the lid in the open state is disposed at the upper side of the hood body with the lid being upside down, it is not favorable to use the animal litter box in the open state.

SUMMARY OF THE INVENTION

The present invention provides an animal litter box which can be used both in an open state and a closed state, with a movable hood that can be compactly accommodated in the open state.

In the animal litter box according to the preset invention the movable hood is configured in a certain shape that is compactly accommodated as it is moved rotatably outside of the fixed hood, thereby accomplishing the present invention. More specifically, the present invention provides the following.

According to a first aspect of the present invention, an animal litter box is provided, which comprises an evacuation container of which an upper surface has an opening and a hood disposed above the evacuation container so as to cover the opening, the hood having a fixed hood disposed on a rear side which is one end of the evacuation container, a movable hood disposed on a front side of the evacuation container, and a pair of connecting portions which connects the movable hood to the fixed hood to be moved rotatably. On the movable hood, an opening which links an inner space of the hood with an outer space of the animal litter box is provided to a front surface on a front side of the movable hood. The front surface is formed to face in nearly a vertical direction. When the movable hood is moved from a closed state to an open state, the movable hood is moved rotatably with the movable hood being located outside of the fixed hood. When the movable hood is in the open state, the movable hood is disposed so as to cover the fixed hood.

According to a second aspect of the present invention, an animal litter box according to the first aspect is provided, wherein, when the movable hood is in a closed state, the movable hood has an overlapping portion with the fixed hood. The pair of connecting portions is disposed in the vicinity of an end edge of the evacuation container in the overlapping portion with the fixed hood so as to face each other, and connects the movable hood with the fixed hood.

According to a third aspect of the present invention, an animal litter box according to the first aspect or the second aspect is provided, wherein a suspended door is provided which opens and closes the opening.

According to a fourth aspect of the present invention, an animal litter box according to any of the first aspect to the third aspect is provided, wherein an external form of the movable hood is formed as a rectangular shape, and a top surface of the fixed hood is formed as a curved shape.

According to a fourth aspect of the present invention, an animal litter box according to any of the first aspect to the fourth aspect is provided, wherein a bottom part of the evacuation container is configured to have a liquid permeable capability, and a lower container is disposed under the evacuation container, the lower container having a drawer tray which can be taken out in nearly a horizontal direction and can collect liquid going through the bottom part of the evacuation container, and wherein the drawer tray can be taken out toward the front side.

The animal litter box of the present invention can be used both in the open state and the closed state, and the movable hood thereof can be compactly accommodated in the open state.

BRIEF DESCRIPTION OF THE DRAWINGS

The invention will become more readily apparent from the Detailed Description of the Invention which proceeds with reference to the drawings, in which.

DETAILED DESCRIPTION OF THE INVENTION

In the following, an animal litter box of the present invention is described with reference to the drawings based on a preferred embodiment.

Figure 1:
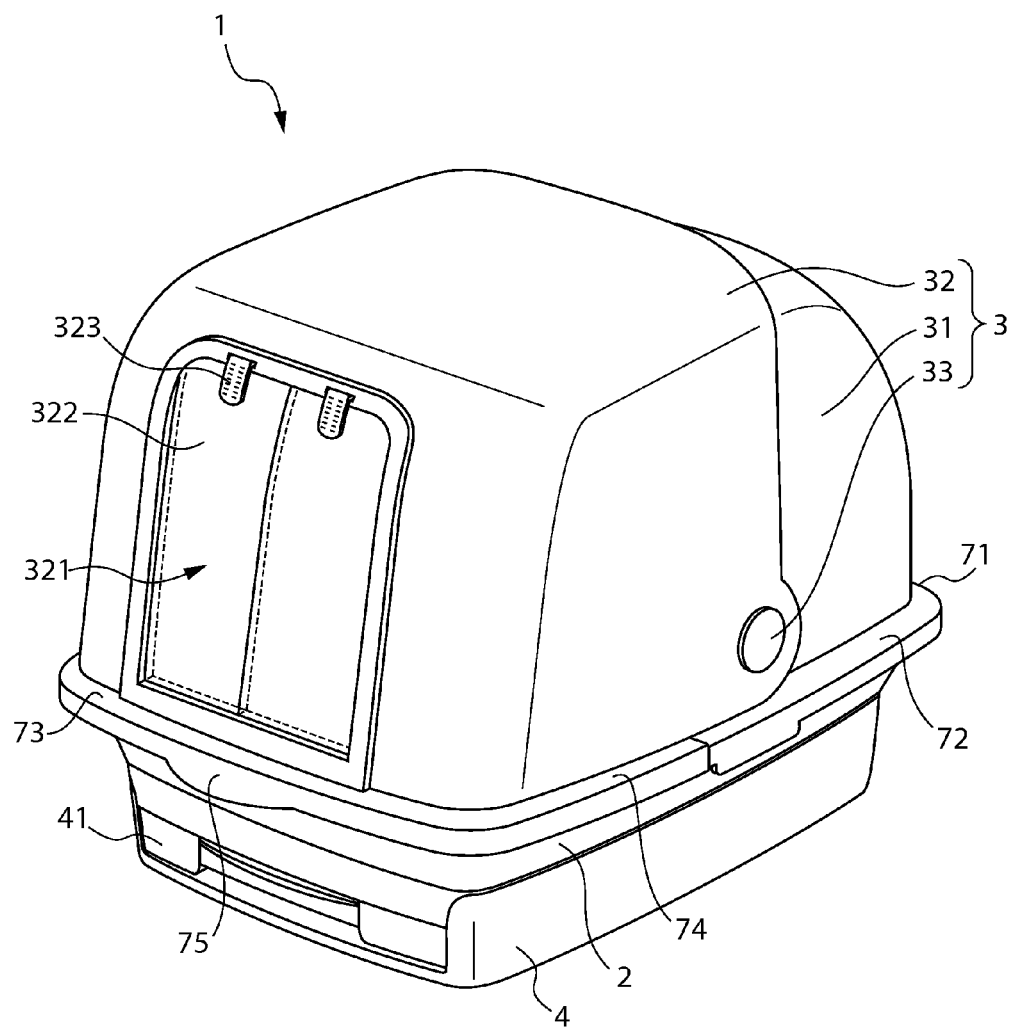
FIG. 1 is a perspective diagram of an animal litter box of the present invention, which is viewed from a front side with a movable hood being in the closed state.
Figure 2:
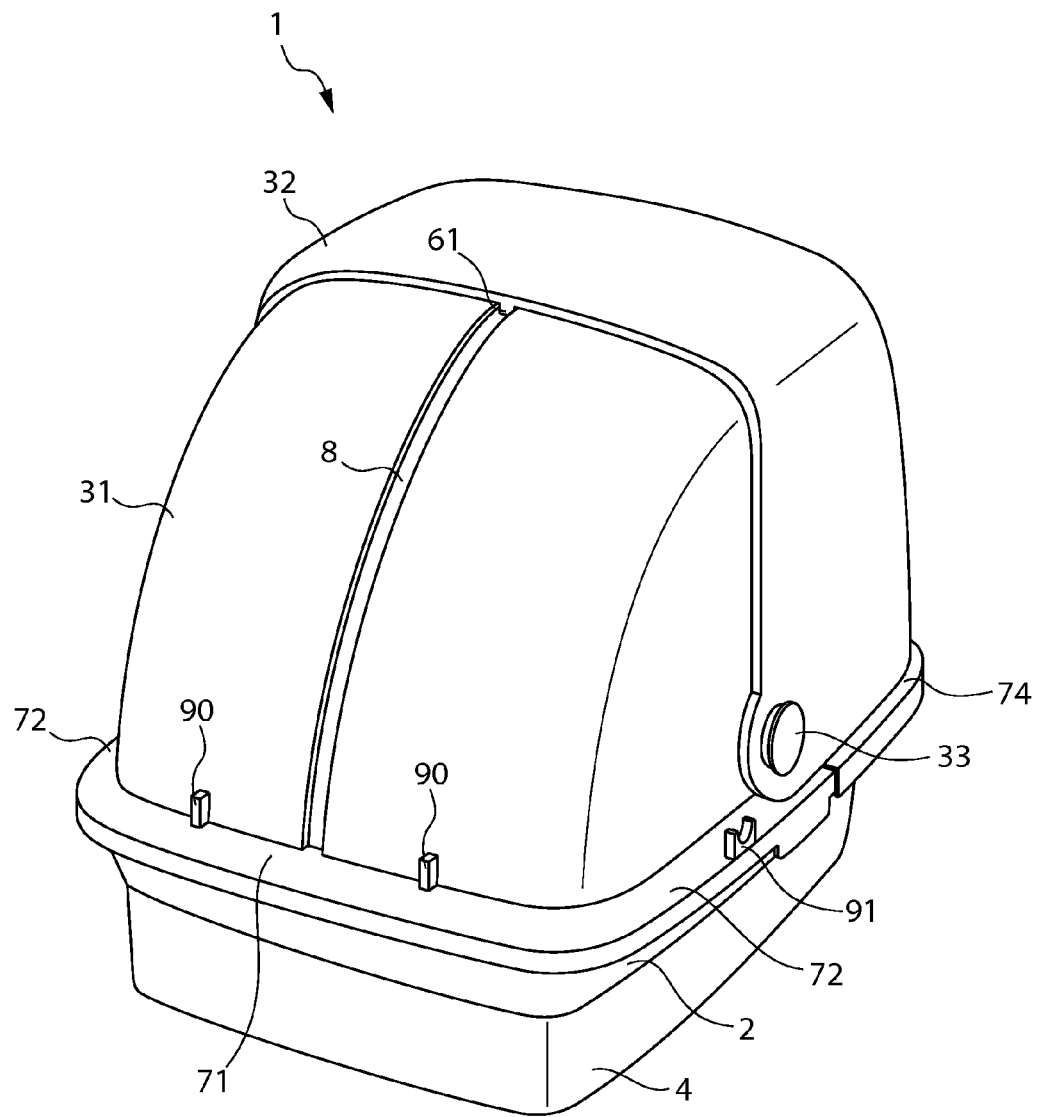
FIG. 2 is a perspective diagram of the animal litter box shown in FIG. 1, which is viewed from a rear side.
Figure 3:
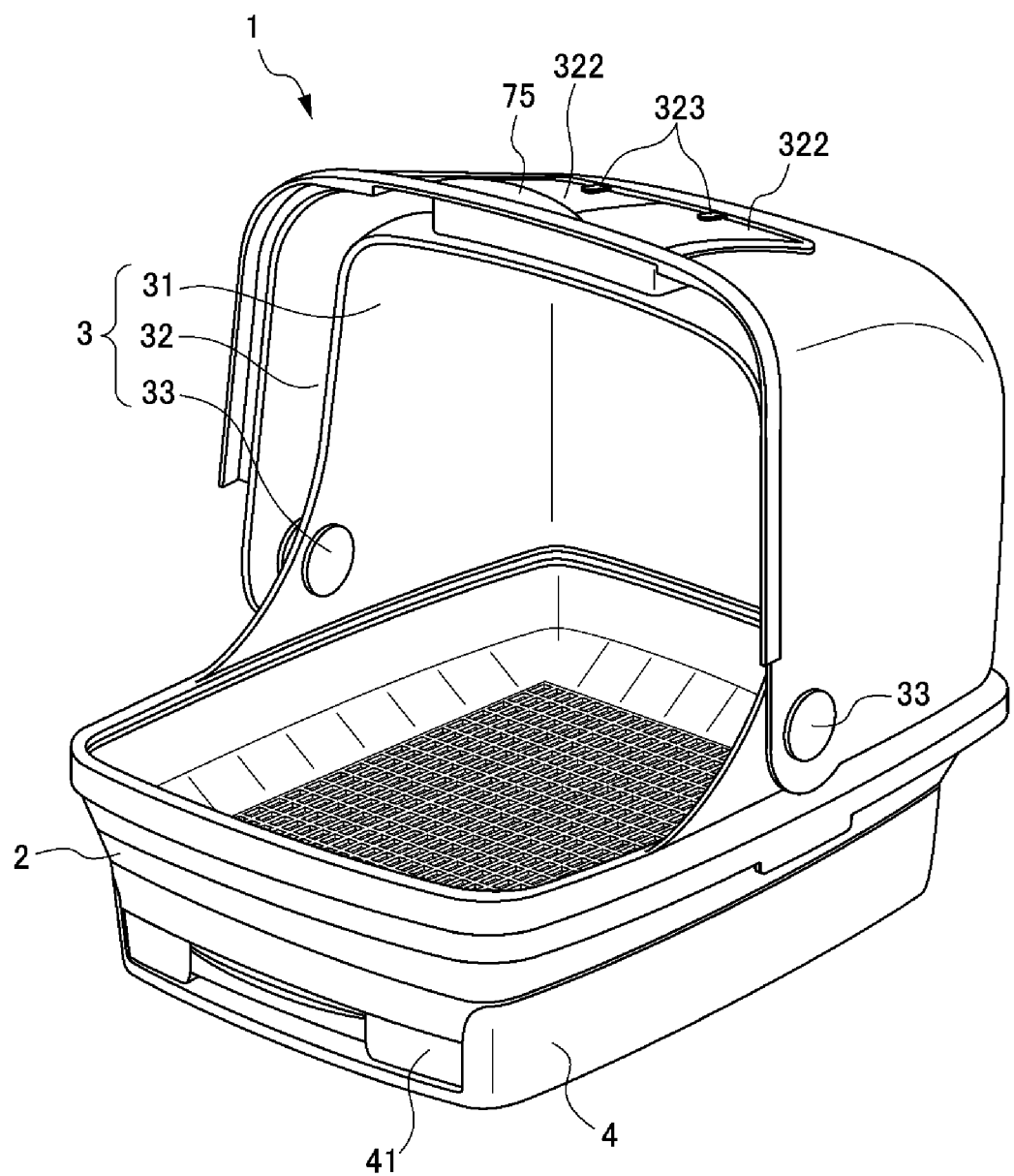
FIG. 3 is a perspective diagram of an animal litter box of the present invention, which is viewed from a front side with a movable hood being in the opened state.

As shown in FIGS. 1 to 3, the animal litter box 1 of the first embodiment is provided with an evacuation container 2 of which an upper surface has an opening and a hood 3 disposed on an upper side of the evacuation container 2 so as to cover the opening. As shown in FIG. 3, the evacuation container 2 is configured to include a bottom part having a rectangularly-shaped surface and sidewalls with a certain height which stand in a nearly vertical direction at each of four sides which act as the rims of the bottom part. The evacuation container 2 is a place where an animal using the animal litter box 1 of the present invention evacuates feces or urine, and granular materials called animal litter (not shown) can be dispersed as appropriate in the evacuation container 2.

The bottom part of the evacuation container 2 is configured to have a liquid permeable capability. In the first embodiment, as shown in FIG. 3, the bottom part has a plurality of rectangular liquid permeable openings, which makes the bottom part gridironed. The shape of the liquid permeable openings is not limited to be rectangular, and may be round, triangle, and the like. In addition, the size of the liquid permeable openings is preferably less than the size of granular materials so that the granular materials dispersed on the bottom part are prevented from dropping downward through the liquid permeable openings. As shown in FIG. 3, a lower container 4 is disposed under the evacuation container 2. A drawer tray 41 which can be taken out in a horizontal direction is provided in the lower container 4. The drawer tray 41 can collect liquid such as animal urine going through the bottom part of the evacuation container 2. An upper surface of the drawer tray 41 is open and a bottom part thereof is formed as a nearly rectangular shape. In addition, the bottom part of the drawer tray 41 is configured to be larger than the part where a liquid permeable opening is formed on the bottom part of the evacuation container 2. Furthermore, the bottom part of the drawer tray 41 can hold detachably and replaceably an absorbent sheet (not shown) which absorbs liquid such as animal urine going through the bottom part of the evacuation container 2. In the first embodiment, the drawer tray 41 can be taken out from a front side on which an opening 321 (described later) is provided.

Figure 4:
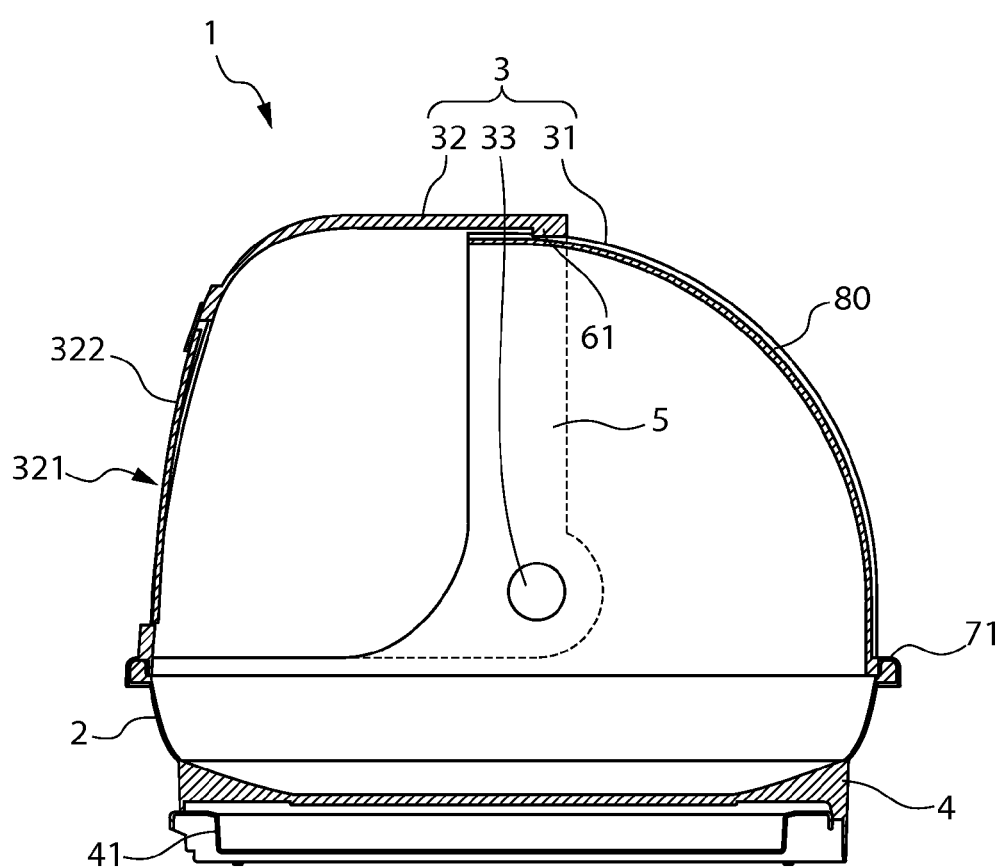
FIG. 4 is a vertical sectional view in an anteroposterior direction of the animal litter box of the present invention with the movable hood being in a closed state.

As shown in FIG. 4, the hood 3 is provided with a fixed hood 31 and a movable hood 32, and is configured in such a manner that the fixed hood 31 is disposed on a rear side of the rectangular evacuation container 2. The rear side is at one end of the fixed hood 31 in the longitudinal direction, and is fixed with the evacuation container 2. The movable hood 32 is disposed on a front side of the rectangular evacuation container 2, the front side of which is at the other end of the hood 3 in the longitudinal direction, and has an overlapping portion 5 where the movable hood 32 overlaps with the fixed hood 31. In addition, the fixed hood 31 is connected with the movable hood 32 by a pair of connecting portions 33 located at a portion of the overlapping portion 5 where the movable hood 32 overlaps with the fixed hood 31. The movable hood 32 is configured to be moved rotatably. In addition, a pair of the connecting portions 33 may connect the movable hood 32 with the fixed hood 31 so that the movable hood 32 can be moved rotatably.

As shown in FIGS. 1 to 3, the fixed hood 31 covers nearly half of the evacuation container 2, which is equivalent to the rear side of the evacuation container 2, and a top surface of the fixed hood 31 is formed as a nearly a circularly arced surface which is curved from the one end of the front side of the fixed hood 31 toward the other end of the rear side. In addition, both side surfaces of the fixed hood 31 stand in nearly a vertical direction. Furthermore, the front side and the lower side of the fixed hood 31 are open.

The movable hood 32 covers nearly half of the evacuation container 2, which is equivalent to the front side of the evacuation container 2, and the external form is nearly a rectangular shape. More specifically, the front surface located at the front side on the movable hood 32 is planar and is formed so as to stand in nearly a vertical direction. In addition, both side surfaces of the movable hood also stand in nearly a vertical direction, and the top surface of the movable hood 32 extends in nearly a horizontal direction. In addition, the rear side and the lower side of the movable hood 32 are open.

As shown in FIGS. 1 and 2, the fixed hood 31 has a protrusion part 7 on an end of the lower side of the fixed hood 31. The protrusion part 7 protrudes externally in nearly a horizontal direction from the end of the lower side of the fixed hood. More specifically, a rear protrusion part 71 is formed on the end of the rear side, and protrudes externally in the longitudinal direction in nearly a horizontal direction. In addition, a pair of fixed hood side protrusion parts 72 is formed on the lower ends of both side surfaces of the fixed hood 31, each of which protrudes externally in the width direction. The fixed hood 31 is fixed on the evacuation container 2 at the rear protrusion part 71 and the pair of fixed hood side protrusion parts 72.

As shown in FIG. 2, a pair of stoppers 90 which protrudes upward toward the movable hood 32 is provided on the rear protrusion part 71. Thus, by providing the stoppers 90 on the rear protrusion part, a distance between the end of the rear side of the movable hood 32 and the rear protrusion part 71 is formed when the movable hood 32 is in the open state. Accordingly, in a case where the movable hood 32 is moved from an open state to a closed state, the movable hood 32 can be easily moved from the open state to the closed state by inserting one's finger into the space. The height of the pair of stoppers 90 is preferably 5 to 35 millimeters, and more preferably 15 to 25 millimeters when inserting one's finger into the space thus formed.

One of the pair of the fixed hood side protrusion parts 72 is provided with a shovel holder 91 for holding a shovel (not shown) used when cleaning the animal litter box 1. The shovel holder 91 is provided proximal to an outer edge in the width direction on the fixed hood side protrusion part 72 so as not to be contacted with the movable hood 32 when the movable hood is moved rotatably.

Similar to the fixed hood 31, the movable hood 32 also has a protrusion part 7 on an end of the lower side of the movable hood 32 in the closed state. The protrusion part 7 protrudes externally in nearly a horizontal direction from the end. More specifically, as shown in FIG. 1, a front protrusion part 73 is formed on the lower end of the front surface of the movable hood 32, and protrudes externally in the longitudinal direction in nearly a horizontal direction. In addition, a pair of the movable hood side protrusion parts 74 is formed on the lower ends of both side surfaces of the movable hood 32, each of which protrudes externally in each width direction. The front protrusion part 73 protrudes further in a longitudinal direction from the center part of the width direction, thus constituting a hood side handle 75 (see FIG. 1). With regard to the animal litter box 1 of the present embodiment, the movable hood 32 can be altered from the closed state to the open state using the hood side handle 75. An outer rim of the hood side handle 75 is formed to be a convexed shape which is curved in a longitudinal direction from a view of flat surface.

As shown in FIG. 1, the movable hood 32 is provided with the opening 321 which links an inner space of the animal litter box 1 with an outer space at the front surface thereof, whereby an animal can go in and out the animal litter box 1 through the opening 321. The shape of the opening 321 may be square, rectangle, circle, ellipse, and the like, and is not limited to a specific shape as long as it is easy for an animal using the animal litter box 1 to go in and out. In the illustrated embodiment, the opening 321 is formed to be a rectangular shape where a vertical direction is a long side of the rectangle.

A suspended door 322 is provided at the opening 321 that can be opened and closed. As shown in FIG. 1, an upper end of the suspended door 322 is connected with an upper edge of the opening 321 by a door connecting member 323, and is suspended swingably from the upper edge of the opening 321. That is, a lower end of the suspended door 322 is a free end, and thus, an animal using the animal litter box 1 of the present embodiment can push the suspended door 322 to easily go in and out an inner space of the animal litter box 1 through the opening 321.

In the present embodiment, nearly an entire opening 321 is covered by the two suspended doors 322 of which shape are nearly identical with each other. That is, each of the two suspended door 322 is formed in such a manner that the length of the suspended door is nearly the same as the height of the opening 321 and the width of the suspended door is nearly a half of the width of the opening 321.

Here, the front surface where the opening 321 is formed stands in nearly a vertical direction as described above. In addition, since the front surface is formed to be planar, the lower end which is the free end of the suspended door 322 is not penetrated deeply into the inner space. That is, since the suspended door 322 does not narrow the inner space where an animal evacuates, an animal can evacuate feces and urine. In order that the lower end of the suspended door 322 is kept from being located in the inner space, a standing angle of the front surface is preferably 65 to 115 degrees, and more preferably 75 to 105 degrees. In a case where the front surface is formed to be curved or a standing angle of the front surface is less than 65 degrees, the lower end of the suspended door 322 is penetrated deeply into the inner space, and thus an animal cannot evacuate feces and urine. In addition, in a case where a standing angle of the front surface exceed 115 degrees, it becomes difficult to open the movable hood in order for the movable hood to be in the open state, or the lower end of the suspended door 322 is pushed forward, which makes it difficult for an animal using the animal litter box 1 to go into the inner space through the opening 321. In addition, a standing angle of the front surface refers to an angle between the front surface and a bottom surface extending to the rear side in a horizontal direction.

As shown in FIG. 4, the fixed hood 31 and the movable hood 32 have the overlapping portion 5 where the area near an end edge of the front side of the fixed hood 31 overlaps with the area near an end edge of the rear side of the movable hood 32 when the movable hood 32 is in the closed state. In addition, the overlapping portion 5 is formed such a manner that the movable hood 32 is located outside of the fixed hood 31. Furthermore, the pair of the connecting portions 33 is provided at a vicinity of an end edge of the evacuation container 2 in the overlapping portion 5, with facing each other. Thus, the animal litter box 1 of the present embodiment is configured such that, in a case where the movable hood 32 is altered from the open state to the closed state, the movable hood 32 which is located outside of the fixed hood 31 can be moved rotatably with the pair of the connecting portions 33 as an axis.

Figure 5:
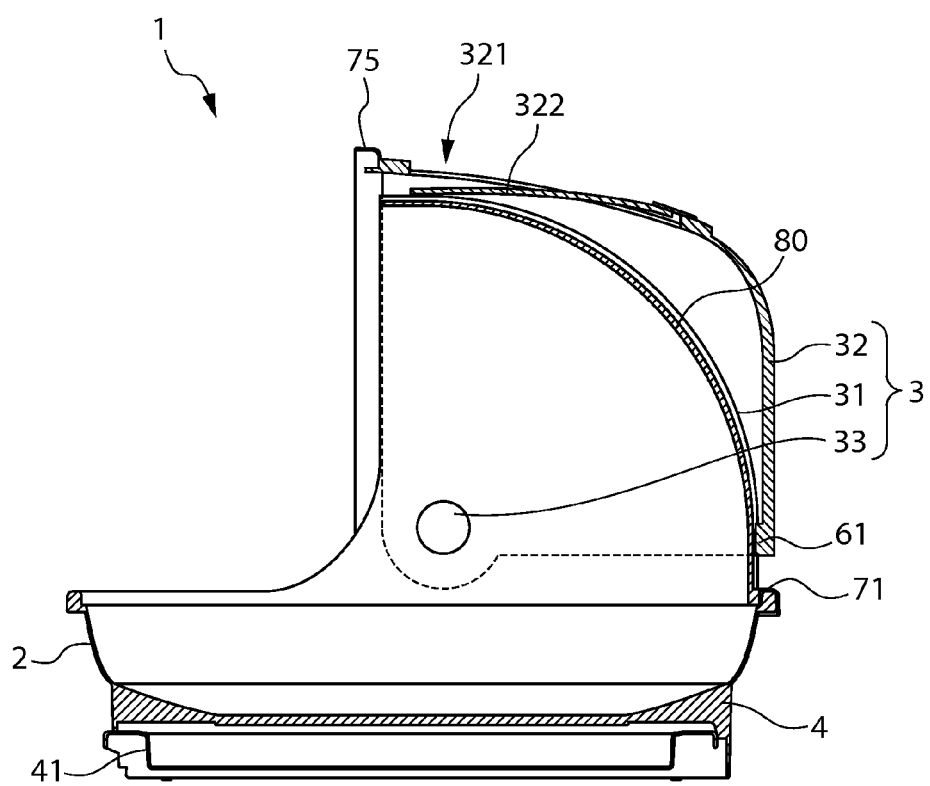
FIG. 5 is a vertical sectional view in an anteroposterior direction of the animal litter box of the present invention with the movable hood being in an opened state.

As shown in FIG. 4, when the movable hood 32 is in the closed state, an end edge of at least the rear side of the movable hood 32 is proximal to the fixed hood 31 while maintaining a prescribed distance to the fixed hood 31. That is, an inner surface of an end edge of the rear side of the movable hood 32 lies in a vicinity of an outer surface of the fixed hood 31. In addition, as shown in FIG. 4, the top surface of the fixed hood 31 is configured as nearly a circularly arced surface of which a radius extends from the connecting portion 33 to the end of the top surface. Therefore, when the movable hood 32 is moved from the closed state to the open state, the movable hood 32 is configured to be moved outside of the fixed hood 31 with an end edge of at least the rear side of the movable hood 32 being proximal to the fixed hood 31 with maintaining a prescribed distance to the fixed hood 31 (see FIGS. 4 and 5). Furthermore, when the movable hood 32 is in the open state, as shown in FIG. 3, the movable hood is disposed so as to cover the outside of the fixed hood 31.

When the movable hood 32 is in the open state, a front surface of the movable hood 32 disposed so as to face upward. Furthermore, the movable hood 32 is disposed so as to cover the outside of the fixed hood 31. Therefore, the suspended door 322 is supported by a top surface of the fixed hood 31, which prevents the suspended door 322 from being weighed down on the evacuation container 2.

In the illustrated embodiment, the movable hood 32 is provided with a convex restricting portion 6 which prevents the distance between an end edge of the rear side of the movable hood 32 and the fixed hood 31 from being less than a prescribed distance. As shown in FIG. 4, the restricting portion 6 is composed of an inwardly protruding portion 61 which is formed on an inner surface of an end edge of the rear side on the upper surface of the movable hood 32.

In addition, in the illustrated embodiment, a concave guiding groove 80 for guiding the moving of the protruding portion 61 when the movable hood 32 is moved from the closed state to the open state is provided on the outer upper surface of the fixed hood 31, the guiding groove which extends from the front side to the rear side. The guiding groove 80 is formed at nearly a center part of the width direction on the top surface of the fixed hood 31, and formed along a curved shape of the top surface from the end of the front side to the end of the rear side.

Then, a distance where the restricting portion 6 is provided between the movable hood 32 and the fixed hood 31 is less than a distance where the restricting portion 6 is not provided between the movable hood 32 and the fixed hood 31. Accordingly, even in a case where the movable hood 32 or the fixed hood 31 is deformed such as by flexure, the movable hood 32 and the fixed hood 31 are contacted only at the restricting portion 6, thereby preventing those hoods from being closer to each other. Consequently, this feature prevents the movable hood 32 from being stuck when it opens and closes, and prevents both hoods from being damaged by friction when the movable hood 32 and the fixed hood 31 are deeply contacted with each other.

Moreover, a concave guiding groove 80 for guiding the moving of the protruding portion 61 when the movable hood 32 is moved from the closed state to the open state is provided on an outer upper surface of the fixed hood 31. The guiding groove extends from the front side to the rear side. Therefore, it can prevent slippage in the width direction when the movable hood 32 is opened or closed, so that the movable hood 32 can be opened and closed smoothly.

The distance where the restricting portion 6 is not provided between the inner surface of an end edge of at least the rear side of the movable hood 32 and the outer surface of the fixed hood 31 is preferably 1 to 10 millimeters, and more preferably 1 to 5 millimeters from the standpoint of sealing of the animal litter box 1 when the movable hood 32 is in the closed state. The distance where the restricting portion 6 is provided between the movable hood 32 and the fixed hood 31 is preferably 0 to 3 millimeters, and more preferably 0 to 1 millimeter.

As a constituent material forming the evacuation container 2, the lower container 4, and the hood 3 which configure the animal litter box 1 of the present embodiment, any type of material which is normally used for an animal litter box may be used without any limitation. For example, synthetic resin such as polyethylene and polypropylene can be used.

According to the animal litter box 1 of the present embodiment with the abovementioned configuration, since the front surface of the movable hood 32 where the opening 321 is formed stands so as to face in nearly a vertical direction, and is formed to be planar, the lower end which is the free end of the suspended door 322 is not penetrated deeply into the inner space, and thus an animal can evacuates feces and urine. In addition, according to the animal litter box 1 of the present embodiment, since the movable hood 32 is disposed so as to cover the outside of the fixed hood 31 when the movable hood 32 is in the open state, the movable hood can be compactly accommodated in the open state. Moreover, since the movable hood 32 in the open state is disposed so as to cover the outside of the fixed hood 31, the suspended door 322 is supported by a top surface of the fixed hood 31, which prevents the suspended door 322 from being weighed down on the evacuation container 2. Accordingly, the animal litter box 1 of the present embodiment can be preferably used both in the closed state and the open state.

In addition, since the external form of the movable hood 32 as depicted is formed to be nearly a rectangular shape and a top surface of the fixed hood 31 is formed to be curved, the movable hood 32 of the animal litter box 1 of the present embodiment can be opened smoothly, and the movable hood can be compactly accommodated in the open state. In addition, the movable hood 32 and the fixed hood 31 are arranged so as to have an overlapping portion 5 where the movable hood 32 overlaps with the fixed hood 31 when the movable hood 32 is in the closed state, whereby the movable hood 32 can be opened and closed smoothly.

In addition, in the present embodiment, a bottom part of the evacuation container 2 is configured to have a liquid permeable capability. Furthermore, the lower container 4 is disposed under the evacuation container 2, and a drawer tray 41 provided to the lower container 4 can be taken out from a front side on which the movable hood 32 is disposed. That is, according to the animal litter box of the present embodiment, opening the movable hood 32 and drawing the drawer tray 41 can be conducted at the front side. Accordingly, since a person can open the movable hood 32 to clean the evacuation container 2 and can draw the drawer tray 41 to replace an absorbent sheet at the front side, the animal litter box 1 can be easily cleaned.

An animal litter box of the present invention is not limited to the abovementioned embodiments, and can be modified as appropriate without departing from the scope of the present invention. For example, in the present embodiment, although two suspended door 322 are provided to the opening 321, the number of the suspended door 322 may be one, and more than three. In addition, the suspended door 322 may not be provided.

In addition, in the present embodiment, although the front surface of the movable hood 32 is formed to be planar, the present invention is not limited thereto. For example, a front surface may be formed as a curve which is gently curved so as to form a convex anteriorly at the center of a width direction of the front surface.

In addition, in the present embodiment, although the movable hood 32 and the fixed hood 31 are disposed so as to have the overlapping portion 5, the movable hood 32 and the fixed hood 31 may not have the overlapping portion 5.

In addition, in the present embodiment, although the evacuation container 2 is provided with the bottom part with a liquid permeable capability and the lower container 4 is disposed under the evacuation container 2, the evacuation container 4 may be without a liquid permeable capability or the lower container 4 may not be disposed under the evacuation container 2.

An animal litter box of the present invention may be used as a litter box for domestic pets such as cats, dogs, rabbits, and the like. Specifically, an animal litter box of the present invention can be preferably used as a litter box for a cat kept indoors.

What is claimed is:

1. An animal litter box comprising:
    an evacuation container of which an upper surface has an opening; and
    a hood disposed above the evacuation container so as to cover the opening, the hood having a fixed hood disposed on a rear side at one end of the evacuation container, a rotatable hood disposed on a front side of the evacuation container, and a pair of connecting portions which connects the rotatable hood to the fixed hood to be rotated,
    wherein on the rotatable hood, an opening which links an inner space hood with an outer space of the animal litter box is provided to a front surface which is located on the front side of the rotatable hood, and a suspended door which opens and closes the opening is suspended from an upper edge of the opening,
    wherein the front surface extends in a substantially vertical direction,
    wherein, in a case where the rotatable hood is rotated from a closed state to an open state, the rotatable hood is rotated with the rotatable hood being located outside of the fixed hood in the open state, and
    wherein, when the rotatable hood is in the open state, the rotatable hood is disposed so as to cover an outside of the fixed hood.

2. The animal litter box according to claim 1,
    wherein, when the rotatable hood is in a closed state, the rotatable hood has an overlapping portion with the fixed hood, and
    wherein each of the pair of connecting portions is disposed near an end edge of the evacuation container in the overlapping portion face the other correcting portions, and the pair of correcting portions connects the rotatable hood with the fixed hood.

3. The animal litter box according to claim 1,
    wherein an external form of the movable hood is formed as a rectangular shape and a top surface of the fixed hood is formed as a curved shape.

4. The animal litter box according to claim 1,
    wherein a bottom part of the evacuation container is configured to have a liquid permeable capability, and a lower container is disposed under the evacuation container, the lower container having a drawer tray which can be taken out in nearly a horizontal direction and can collect liquid going through the bottom part of the evacuation container, and
    wherein the drawer tray can be taken out toward the front side of the evacuation chamber.

5. The animal litter box according to claim 1, wherein:

the rotatable hood has a protruding portion formed on an inner surface of the rotatable hood, and the fixed hood has a guiding groove for guiding the protruding portion, the guiding groove extending from a front side to a rear side on a top surface of the fixed hood.

6. The animal litter box according to claim 1, wherein a pair of suspended doors which opens and closes the opening is provided on the opening, each door being connected adjacently to the other at an upper edge of the opening by a door connecting member.

7. An animal litter box comprising:

an evacuation container of which an upper surface has an opening; and a hood disposed above the evacuation container so as to cover the opening, the hood having a fixed hood disposed on a rear side at one end of the evacuation container, a rotatable hood disposed on a front side of the evacuation container, and a pair of connecting portions which connects the rotatable hood to the fixed hood to be rotated, wherein the rotatable hood includes:

an opening which links an inner space hood with an outer space of the animal litter box; and a front surface which is located on the front side of the rotatable hood, wherein an upper edge of the opening is located near an upper corner at the rotatable hood in the front surface thereof, wherein the front surface extends in a substantially vertical direction, wherein, in a case where the rotatable hood is rotated from a closed state to an open state, the rotatable hood is rotated with the rotatable hood being located outside of the fixed hood in the open state, and wherein, when the rotatable is in the open state, the rotatable hood is disposed so as to cover an outside of the fixed hood.

* * * * *